(12) United States Patent
Rogers

(10) Patent No.: US 10,661,152 B2
(45) Date of Patent: *May 26, 2020

(54) POWERED PERSONAL TRANSPORTATION SYSTEMS AND METHODS

(71) Applicant: Stealth Electric Longboards, LLC, Longmont, CO (US)

(72) Inventor: Aaron Paul Rogers, Superior, CO (US)

(73) Assignee: STEALTH ELECTRONIC LONGBOARDS, LLC, Longmont, CO (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/920,183

(22) Filed: Mar. 13, 2018

(65) Prior Publication Data

US 2019/0083877 A1    Mar. 21, 2019

Related U.S. Application Data

(63) Continuation of application No. 15/441,505, filed on Feb. 24, 2017, now Pat. No. 9,943,750, which is a continuation of application No. 13/841,396, filed on Mar. 15, 2013, now Pat. No. 9,616,318.

(51) Int. Cl.
| | |
|---|---|
| *A63C 17/12* | (2006.01) |
| *A63C 17/01* | (2006.01) |
| *A63C 17/22* | (2006.01) |
| *B60L 50/51* | (2019.01) |
| *B60K 7/00* | (2006.01) |
| *H02K 9/02* | (2006.01) |
| *H02K 15/14* | (2006.01) |
| *H02P 6/16* | (2016.01) |

(52) U.S. Cl.
CPC ............ *A63C 17/12* (2013.01); *A63C 17/012* (2013.01); *A63C 17/015* (2013.01); *A63C 17/223* (2013.01); *B60K 7/0007* (2013.01); *B60L 50/51* (2019.02); *H02K 9/02* (2013.01); *H02K 15/14* (2013.01); *H02P 6/16* (2013.01); *A63C 2203/12* (2013.01); *B60K 2007/0092* (2013.01); *Y10T 29/49009* (2015.01)

(58) Field of Classification Search
CPC ..................................................... A63C 17/12
See application file for complete search history.

(56) References Cited

U.S. PATENT DOCUMENTS 5,735,361 A * 4/1998 Forrest ................... A63C 11/10
180/180
7,293,622 B1 * 11/2007 Spital ...................... A63C 17/12
180/180

(Continued)

*Primary Examiner* — Raymond L Nimox

(57) ABSTRACT

A personal vehicle system including a control system and at least one wheel motor coupled to the personal vehicle system and subject to control by the control system. A control system for a personal vehicle system including steps for calibrating the control system, where the control system includes a sensor system having load sensors incorporated into the personal vehicle system and also having lean forward and lean backward outputs, a user interface that prompts a user to lean forward and backward and allows a user to input a sensitivity value, and an electronic hardware component for calculating a normalization value where the wheel motor current is controlled as a function of the normalization value.

18 Claims, 12 Drawing Sheets

(56) References Cited

U.S. PATENT DOCUMENTS

| | | | |
|---|---|---|---|
| 2005/0067207 A1* | 3/2005 | Radtke | B62M 6/45 180/223 |
| 2005/0121866 A1* | 6/2005 | Kamen | A63C 17/01 280/47.18 |
| 2005/0126832 A1* | 6/2005 | Amsbury | B60L 15/2045 180/7.1 |
| 2005/0236215 A1* | 10/2005 | Kamen | A63C 17/01 180/315 |
| 2006/0055165 A1* | 3/2006 | Negoro | A63C 17/01 280/841 |
| 2007/0296170 A1* | 12/2007 | Field | A63C 17/01 280/47.131 |
| 2008/0039990 A1* | 2/2008 | Stevens | G05D 1/0891 701/22 |
| 2011/0168465 A1* | 7/2011 | Starr | B60K 7/0007 180/65.51 |
| 2013/0081891 A1* | 4/2013 | Ulmen | A63C 17/12 180/181 |
| 2014/0262574 A1* | 9/2014 | Rodgers | A63C 17/12 180/167 |
| 2014/0326525 A1* | 11/2014 | Doerksen | A63C 17/12 180/181 |

* cited by examiner

POWERED PERSONAL TRANSPORTATION SYSTEMS AND METHODS

CROSS REFERENCE TO RELATED APPLICATIONS

This application is a continuation of U.S. patent application Ser. No. 15/441,505 filed on Feb. 24, 2017, which is a continuation of U.S. patent application Ser. No. 13/841,396 filed on Mar. 15, 2013, which are incorporated by reference in their entirety for all purposes.

TECHNICAL FIELD

Embodiments related generally to personal transportation systems and methods.

BACKGROUND

Personal powered transportation allows one to travel intermediate distances at a comfortable pace without expending excess energy. One example of such a personal powered transportation system includes an electric long board (which may be similar to an elongated skateboard, which is intended for traveling intermediate distances rather than short distances, and which is intended primarily for transportation rather than the performance of tricks). Existing systems often use motors that are coupled to the wheels with belts or chains, making them susceptible to the elements. Existing systems may only be able to power one wheel on a vehicle leading to poor performance. Also, bulky gears or transmission systems are often used to achieve a variety of speeds.

Current solutions to personal powered transportation are often overly complex and unreliable. Heavy and bulky designs reduce portability and decrease travel distances between refueling or recharging. Cumbersome control systems are difficult to use and potentially dangerous, often requiring the use of the hands. Further, current solutions visibly stand out from traditional unpowered recreational vehicles. For example, current electric long boards often visually resemble traditional long boards but with bulky, obtrusive additions for controlling and powering the boards. Existing current electric long boards look distinctly different from, and lack the sleek profile of their non-electric long board counterparts.

SUMMARY

Embodiments include systems and methods for users to travel on a powered personal vehicle system. In one embodiment, a personal vehicle system includes a deck having a substantially flat top surface, for which the top surface is substantially flat and is of sufficient area to support two feet of a user, a truck coupled to the deck, in which the truck includes of a first portion coupled to the deck and a second portion that tilts relative to the first portion, and a wheel motor coupled to the second portion of the truck. The personal vehicle system can also have two wheel motors coupled to the second portion of the truck, and can also have a control system configured to coordinate operation of the first wheel motor and the second wheel motor. Such a control system can activate and regulate power input, speed, and torque of the first wheel motor and the second wheel motor as a function of a weight distribution of the user on the deck, and the control system can coordinate the operation of the first wheel motor and the second wheel motor as a function of current.

According to such embodiments, the personal vehicle system can also have a wireless mobile device and a wireless mobile application executed by the wireless mobile device, in which the wireless mobile application is configured to receive and transmit information from the control system, and the control system provides calibration parameters to the wireless mobile application and the wireless mobile application calibrates the calibration parameters of the control system. In some cases, the personal vehicle system can also have at least one force sensor configured to measure a force or a deck displacement strain, and the force sensors can be embedded in the deck. In some instances, the personal vehicle system includes a control system that is configured to control the first wheel motor and the second wheel motor as a function of a force output signal from the force sensors.

In another embodiment, a personal vehicle system includes a deck, a truck coupled to the deck, and a wheel motor coupled to the truck. The wheel motor may have a passive cooling system. The passive cooling system includes at least one endcap that rotates about a wheel rotation axis during operation of the wheel motor, and the endcap has at least one fin, according to some embodiments. The personal vehicle system can also have at least three fins, or at least five fins, such that the fins extends in a radial orientation about the wheel rotation axis, and the fins are angularly distributed equally about the wheel rotation axis. The personal vehicle system can also have at least two end caps that each have fins, and the two end caps have an equal number of fins. In some cases, the inner endcap includes more fins than the outer endcap. In some cases, the fins on the inner endcap are smaller than the fins on the outer endcap. In some cases, the personal vehicle system can have a wheel motor including a wheel motor assembly in which the two outermost ends of the wheel motor assembly are enclosed by two endcaps. Further, a single bolt, or a single compression connector, compresses and holds together the endcaps and the wheel motor assembly along the wheel rotational axis.

According to some embodiments, the truck is in thermal communication with the wheel motor. The wheel motor may be a gearless motor or a brushless electric motor. The wheel motor may include a flux canister and a stator, and the average of a first radius of an outer most circumference of the stator with respect to the wheel rotational axis and a second radius of an inner most circumference of the flux canister with respect to the wheel rotational axis is between 30% and 90%, or between 40% and 80%, or between 50% and 75%, or between 55% and 65%, of a third radius of an outermost circumference of the flux canister with respect to the wheel rotational axis.

In another embodiment, a method for assembling a wheel motor includes sliding the stator shaft of the wheel motor over the truck axle, sliding the wheel motor assembly onto the stator shaft, and compressing the wheel motor with a single compressing connector coupled to the truck axle. The wheel motor assembly may include a stator, an inner endcap, an inner bearing, an outer endcap, an outer bearing, a flux ring, a traction surface, and/or a rotor position sensor.

In another embodiment, a method for assembling a wheel motor includes sliding a stator shaft over a truck axle, with an inner bearing and an inner endcap forming an inner endcap assembly, sliding an inner endcap assembly onto the stator shaft, a rotor position sensor, and a stator forming a stator assembly, sliding the stator assembly onto the stator shaft, at least one magnet, a flux ring, and a traction surface forming a rotor assembly, sliding the rotor assembly over the stator assembly, an outer bearing, an outer endcap, and a washer forming an outer endcap assembly, sliding the outer endcap assembly onto the stator shaft, and compressing the stator shaft, the inner endcap assembly, the stator assembly, the rotor assembly, and the outer endcap assembly to the truck with a single bolt, or a single compression connector, coupled to the truck axle. Such methods may also include sliding a rotor position sensor onto the stator shaft and inserting a wheel motor wire through the center of the inner bearing and connecting the wheel motor wire to the rotor position sensor.

In another embodiment, a truck package kit includes components for converting an unpowered personal vehicle to a powered personal vehicle, the truck package kit including a truck assembly, at least one wheel motor attached to the truck, a control system, at least one sensor, and an instruction manual for converting the personal vehicle and calibrating the control system.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

Corresponding reference characters indicate corresponding parts throughout the several views.

Figure 1:
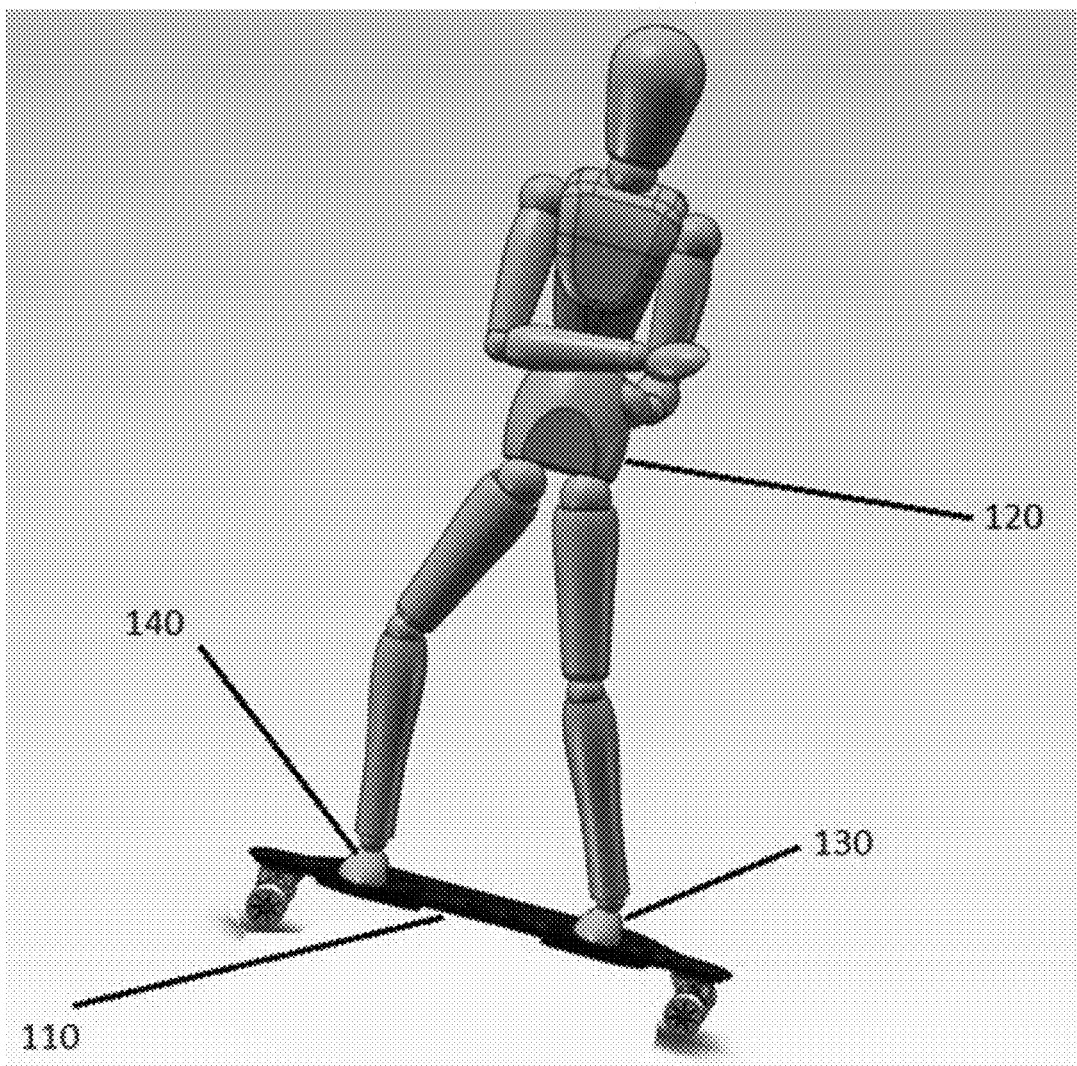
FIG. 1 illustrates a side perspective view of a user with a personal vehicle system, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

As shown in FIGS. 1, 2, 6 and 9, a personal vehicle system 110 ("PVS") includes four wheels, two front self-contained, powered wheel motors 220, and two back wheels 210. The wheels 210, 220 spin about a wheel rotation axis 690 defined by a truck axle 235 that is supported by a truck 230, 230'. The two trucks 230, 230' are attached to opposite ends of a deck 225 creating a stable four wheel vehicle. The top of the deck 950 is substantially flat and is of sufficient area to support a user 120. In other embodiments the shape and size of the deck vary. The wheels 210, 220 support the user 120 above a surface, for example a road, and the PVS 110 allows the user to travel about in a supported and balanced fashion. The user's 120 right foot 140 and left foot 130 control the steering of the PVS 110 by tilting the deck 225 relative to the trucks 230, 230' and wheels 220, 210. The speed, acceleration, and braking of the PVS 110 are determined by the relative deck position and weight distributions between the right foot 140 and left foot 130.

Figure 8:
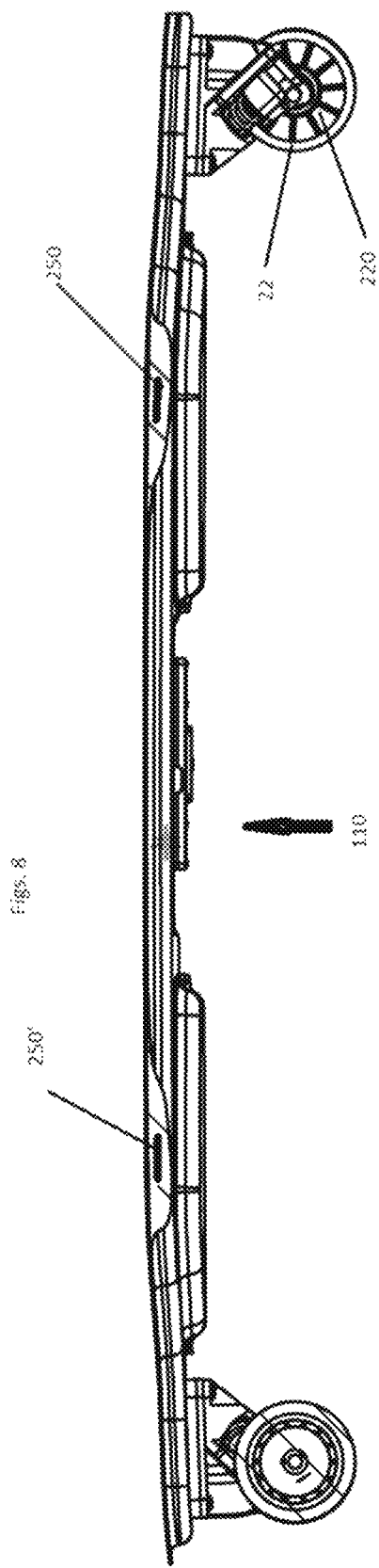
FIG. 8 illustrates a cross-sectional side view of the personal vehicle system of FIG. 2 taken along line B-B of FIG. 2, showing a position of sensors, according to the embodiments of the present invention.
Figure 9:
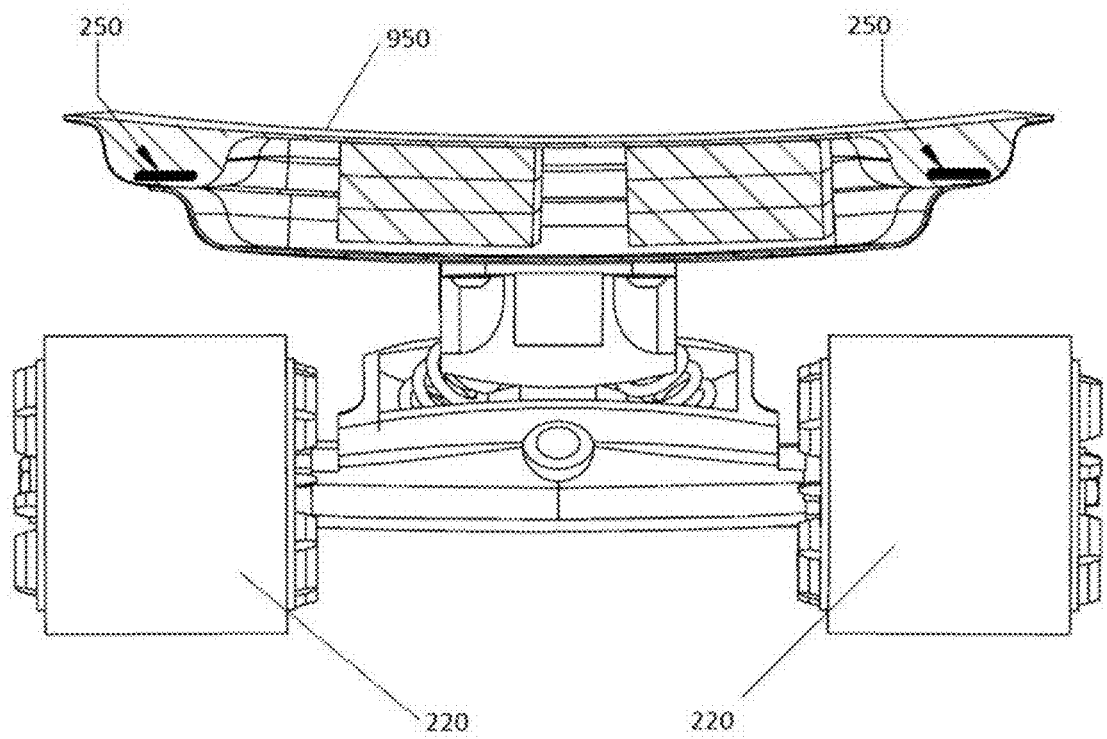
FIG. 9 illustrates a cross-sectional front view of the personal vehicle system of FIG. 2 taken along line A-A of FIG. 2, according to the embodiments of the present invention.

In one embodiment, the deck 225 is made from a strong, durable, and light weight carbon fiber. The carbon fiber deck 225 allows the PVS 110 to remain light weight and thin in profile without sacrificing durability or performance. FIG. 8 show the thin, sleek profile of the PVS 110 as seen from the side, taken along line B-B of FIG. 2. FIG. 9 shows the thin profile of the cross section of the PVS 110 when the deck 225 is cut in half, as taken along line A-A of FIG. 2. In other embodiments the deck is made from wood, metal, composite, or a combination of materials.

In one embodiment the personal vehicle system 110 also includes two wheel motors 220 attached to the front truck 230 and two unpowered wheels 210 attached to the rear truck 230', in another embodiment the two wheel motors are attached to the rear truck and the two unpowered wheels are attached to the front truck. In another embodiment all four wheels are wheel motors, and in another embodiment only one wheel is a wheel motor. The wheel motors 220 each contain an internal electric motor that produces the required force to drive and thus rotate the wheel motors. Further, the wheel motors 220 are operated without belts, gears, or mechanical power couplings connected thereto. The wheel motors 220 can be in a powered or a free state. While in the powered state the wheel motors 220 can provide different levels of torque, acceleration, speed, braking, and regenerative braking. While in the free state the wheel motors 220 act similar to conventional unpowered wheels.

The wheel motors 220 are powered and controlled through wheel motor wires 50 connected to a control system 280. The wheel motor wires 50 run from the control system 280, across the deck 225, through the truck 230, and to the wheel motors 220 by running through the wire slot 370 on the truck 230. The wheel motor wires 50 enter the wheel motor through the center of the inner bearing 2 and along the wire groove 45 on the stator shaft 1. In one embodiment the wheel motor wires connect to the rotor position sensor 9 and the stator 6. The control system 280 is housed in the control system port 270 which is a part of the deck 225. The control system is coupled to the deck 225 with an adhesive technology. In one embodiment the adhesive technology is Velcro or other hook-and-loop type fastener. The control system 280 has a top surface made from a material with a high heat transfer coefficient to remove excess heat, and bottom surface made from an electrically insulating material. In one embodiment the top surface of the control system is made from aluminum and the bottom surface is made from plastic. In one embodiment the control system 280 receives power from one battery 215; in another embodiment the control system receives power from two or more batteries 215. The battery 215 and the control system 280 are connected by wires. The battery 215 is located between the deck 225 and the battery cover 240. The battery cover 240 provides a watertight chamber for the battery 215. The control system 280 is also water tight. In one embodiment the battery 215 is a lithium ion battery that can be recharged with a recharging unit or through regenerative braking applied by the wheel motors 220. In another embodiment the battery is made from a conventional battery technology. One battery 215 can power two wheel motors 220 with a standard weight user 120 over standard terrain for approximately five miles and reach speeds up to twenty miles per hour.

The control system 280 is an electronic hardware component and software assembly that both sends output signals via wiring to the wheel motors 220 and receives input signals from the wheel motors 220. The control system 280 is replaceable to allow for maintenance, repair, and upgradability. The control system 280 is pre-programmed to allow for plug and play operability and can automatically recognize connected wheel motors. The control system has multiple connection ports that allow for multiple wheel motors or wheel motor axle assemblies to be connected to the control system. In one embodiment the control system can connect to four wheel motors or two wheel motor axle assemblies. The control system 280 coordinates the operations of the two wheel motors 220 and also synchronizes the two wheel motors 220 so that the PVS 110 can be properly controlled. By varying current, the control system 280 regulates the torque, rotational speed, ground speed, acceleration, and deceleration of the wheel motors 220. In one embodiment in which two wheel motors 220 are coupled to the same truck 230, the control system is able to independently control each wheel motor 220. The wheel motors 220 send operating parameters, for example temperature, motor serial number, motor ID, rotor position and rotational speed (e.g. rpm) back to the control system 280. The control system 280 determines the operations of the wheel motors based on calibration parameters and force output signals received from force sensors 250, 250' ("sensor") embedded in the deck 225. In one embodiment the PVS 110 has four sensors 250, 250' embedded in the deck 225, two sensors 250 near the front of the deck and two sensors 250' near the rear of the deck; in other embodiments there may be one sensor, two sensors, three sensors, or more than four sensors. Sensors 250, 250' may be embedded or otherwise concealed within the deck 225 in order to create a more aesthetic appearance, and so as to not interfere with the user's feet 130, 140.

The sensors 250, 250' measure force. In one embodiment the force measured by the sensors 250, 250' is a load or weight. In another embodiment the force measured by the sensors 250, 250' is deck displacement strain in the deck material. The sensors 250, 250' may be load cells, strain gauges, or other suitable technology. The varying amount of force applied to the different sensors 250, 250' is based on the user's 120 weight distribution and foot placement with respect to the deck 225. If more force is detected by the front sensors 250 in comparison with the back sensors 250' the control system 280 activates motion or acceleration of the wheels motors 220. If the reverse is true, the control system 280 deactivates the wheel motors 220 or initiates deceleration, braking, or stoppage. If no weight or force is detected on the front sensors 250 (e.g., the user 120 is no longer on the PVS 110) the control system 280 signals the wheel motors 220 to apply full braking until they stop.

The calibration parameters of the control system 280 and hence the performance of the wheel motors 220 are based on the weight and technical level of the user and can be adjusted to set a limit on the maximum speed or to optimize battery life. The weight and technical level of the user can be inputted manually or wirelessly into the control system 280. The data can be manually entered into the control system 280 using input controls 205 and a digital display 290. The data can be wirelessly entered into the control system 280 using a wireless mobile device 700 executing a wireless mobile application 710. Two-way communication between the wireless mobile device 700 and the control system 280 is achieved directly through Bluetooth or another wireless technology, and/or is achieved indirectly via a network 720, such as the Internet. The wireless mobile application 710 can display on the mobile device 700 real-time parameters from the wheel motors 220 and the control system 280, for example wheel motor temperature, wheel motor serial numbers, wheel motor ID numbers, battery life, and rotational speed (e.g. rpm). Using the data from the control system 280 and the wheel motors 220, the wireless mobile application 710 calculates one or more of average speed, top speed, travel time, travel distance, battery time remaining, maximum distance on remaining battery charge, average distance on remaining battery charge, and in combination with a GPS application, estimated time of arrival.

The control system 280, in combination with the embedded sensors 250, 250', permits the user 120 to control the PVS 110, including forward motion, braking, forward acceleration, and turning, without the use of any hands, and without the use of any handlebars or any handheld or hand-controlled mechanism, simply by shifting the weight balance among the right and left feet 140, 130.

Figure 10:
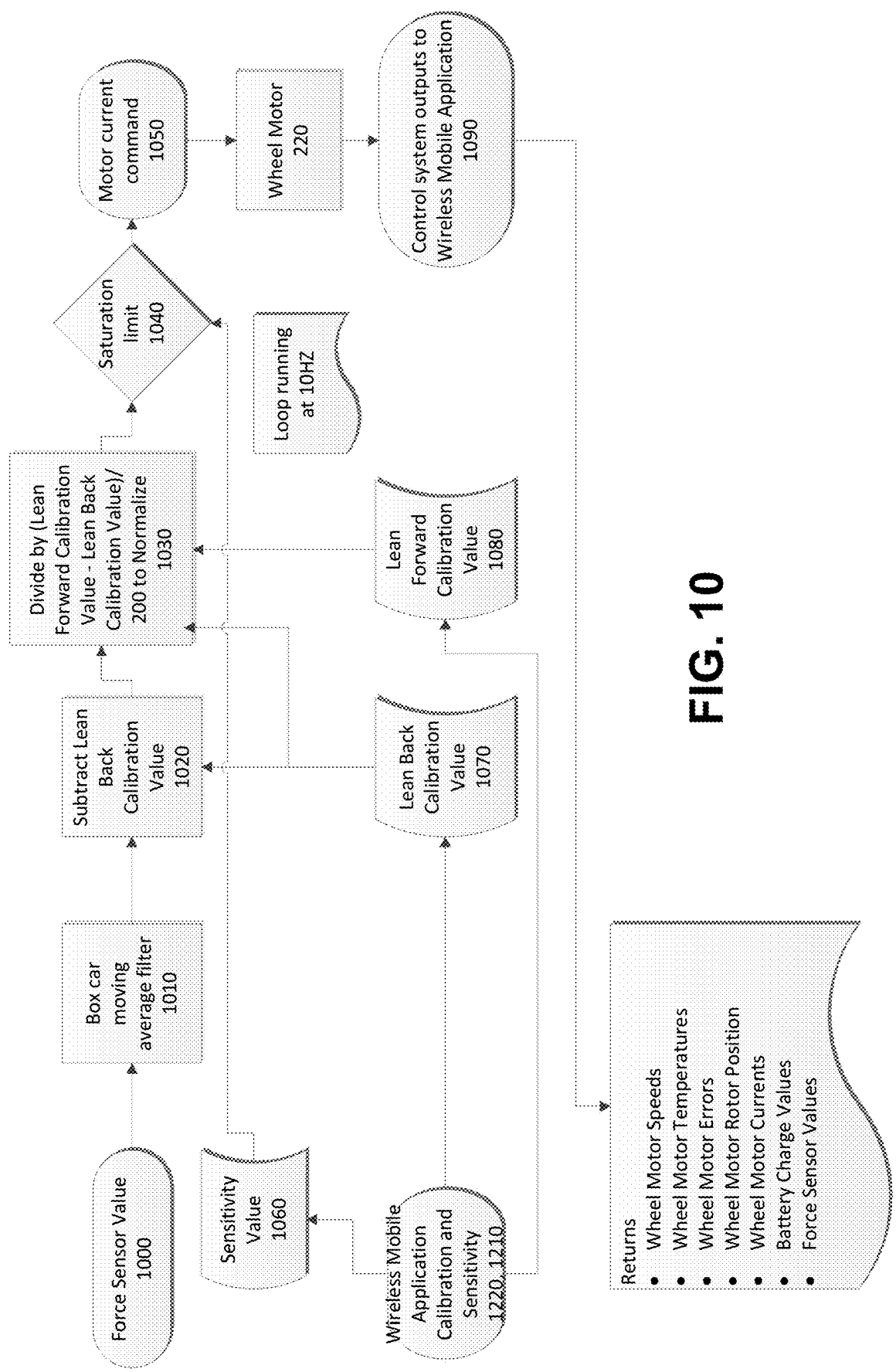
FIG. 10 illustrates a flow chart showing interactions between the mobile wireless application and the control system, according to the embodiments of the present invention.
Figure 11:
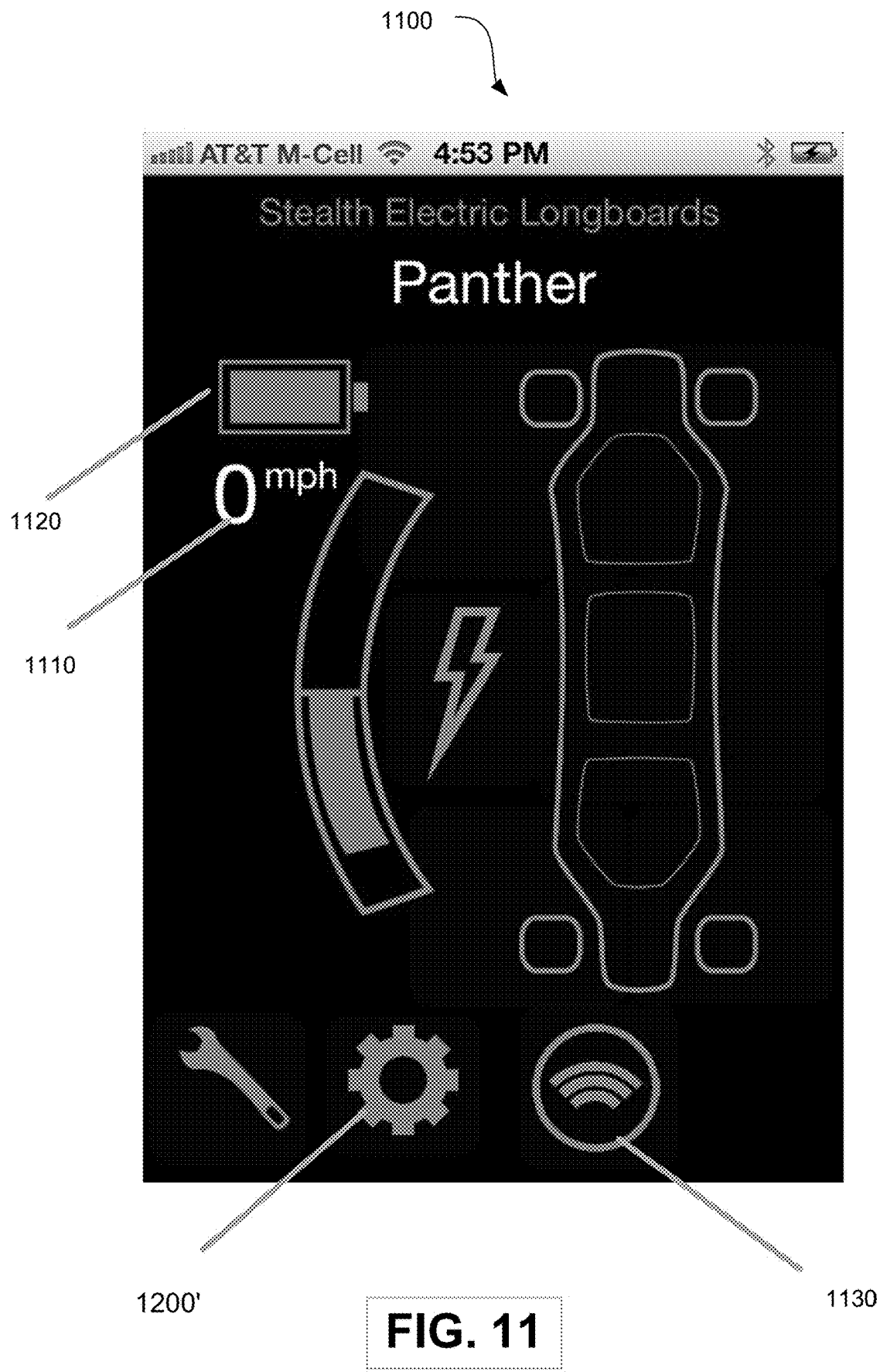
FIG. 11 illustrates a main screen of a wireless mobile application, according to the embodiments of the present invention.
Figure 12:
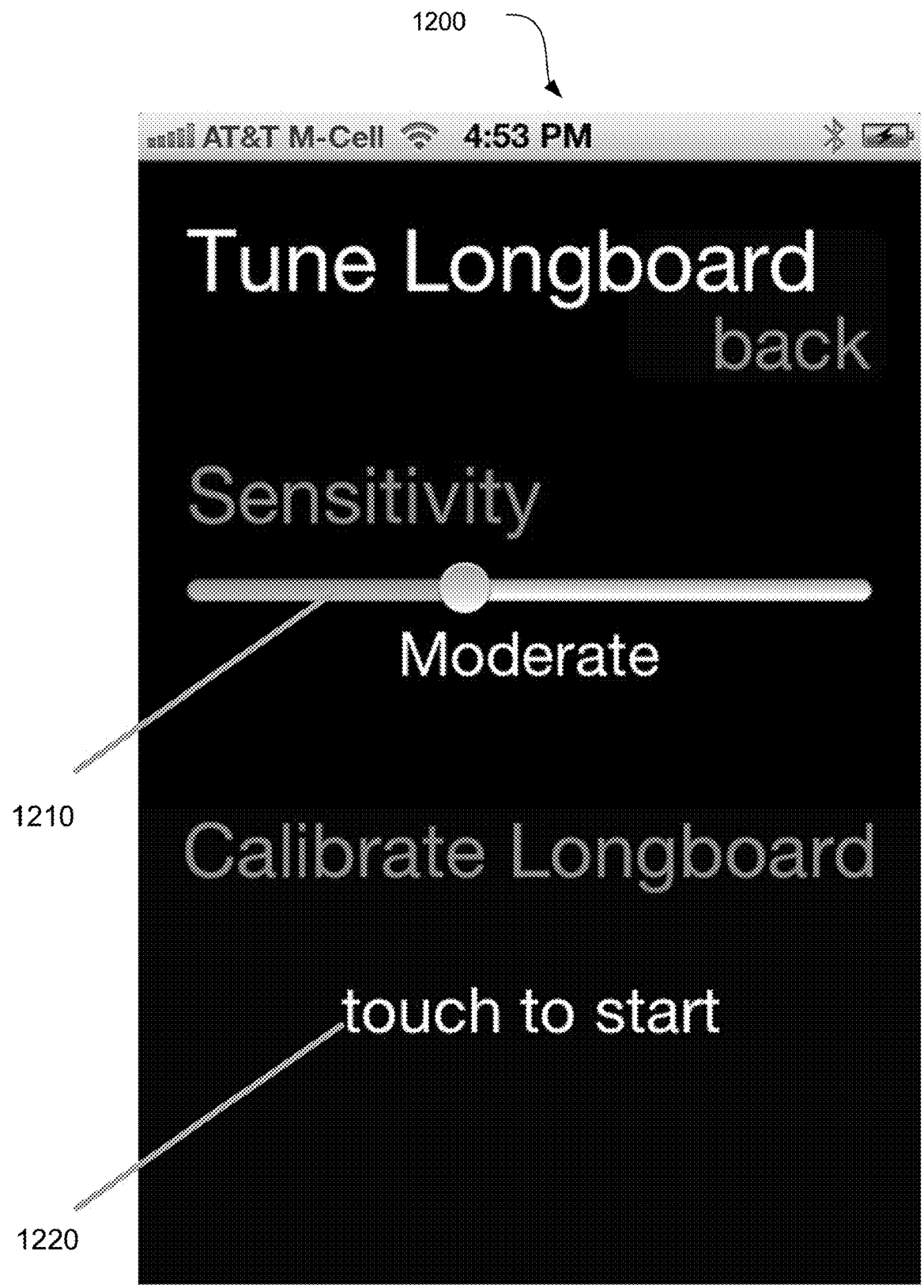
FIG. 12 illustrates a configuration screen of the wireless mobile application, according to the embodiment of the present invention.

FIGS. 10, 11, and 12 further show the interactions between the control system 280, wireless mobile application 710, sensors 250, 250' and the wheel motors 220. The main screen 1100 of the wireless mobile application 710 shows outputs and calculation derived from such outputs received from the control system 280 (for example, battery life 1120 and miles per hour 1110 of the PVS 110; other values can be shown by clicking on different areas of the PVS diagram). In one embodiment the main screen 1100 allows for one touch wireless communication with the control system 280 via the wireless button 1130. The configuration button 1200' leads to the configuration screen 1200. On the configuration screen 1200, the sensitivity slider 1210 adjusts the sensitivity value 1060 of the control system 280. The calibration button 1220 starts a calibration algorithm which records a lean back calibration value 1070 and lean forward calibration value 1080 based on the feedback from the sensors 250, 250'. In one embodiment, when the calibration button 1220 is activated the user 120 is instructed to lean forward on the PVS 110 and the control system records a lean forward calibration value 1080 based on outputs from the sensors 250, 250'; then the user 120 is instructed to stand centered on the PVS 110; then the user 120 is instructed to lean back on the PVS 110 and the control system records a lean back calibration value 1070. With the calibration parameters the control system 280 is able to control the PVS 110 while in operation by the user 120. While in operation the sensors 250, 250' send a force sensor value 1000 to the control system 280. The control system 280 runs the force sensor value 1000 through a box car moving average filter 1010, then subtracts the lean back calibration value 1020, then divides the remaining value by the (lean forward calibration value minus the lean back calibration value) divided by two hundred (200), which may be done for normalization. The normalized value is then capped be a saturation limit 1040 which uses the sensitivity value 1060 to ensure that the wheel motors 220 do not obtain a speed higher than desired by the user 120. The value capped by the saturation limit 1040 is converted to a motor current command 1050 which is sent to the wheel motors 220. Via the control system 280 the wheel motors 220 and control system 280 send outputs to the wireless mobile application (see 1090). Examples of outputs to the wireless mobile application 710 include: wheel motor speeds, wheel motor temperatures, wheel motor errors, wheel motor rotor position, wheel motor currents, battery charge values, and force sensor values. In one embodiment the control system 280 runs calculations, for example the calculations process shown by FIG. 10, at a frequency of ten hertz.

In some cases, a truck package kit may be provided in order to retrofit an existing conventional or non-powered PVS. Such a kit may include at least one truck assembly, where the control system and at least one sensor are integrated into a truck; at least one wheel motor; and an instruction manual. The truck package kit allows for the modification of different types of personal vehicles, for example unpowered skateboards. The instruction manual aids in the use of the kit, describing how to convert an unpowered vehicle and how to calibrate the control system. In another embodiment, a truck package kit includes: at least one truck, at least one wheel motor, a control system, at least one sensor, and an instruction manual.

Figure 2:
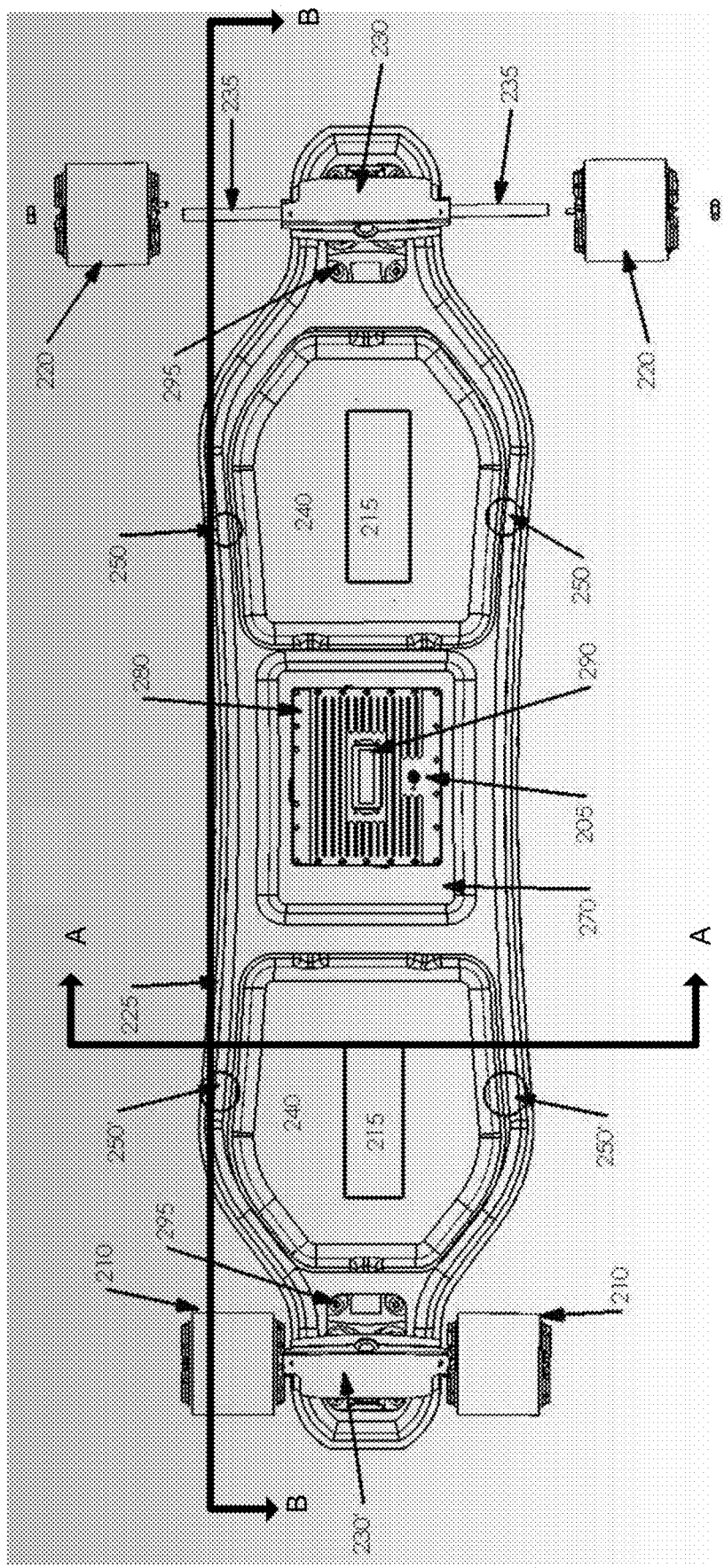
FIG. 2 illustrates a bottom plan view of a personal vehicle system, according to embodiments of the present invention.
Figure 3:
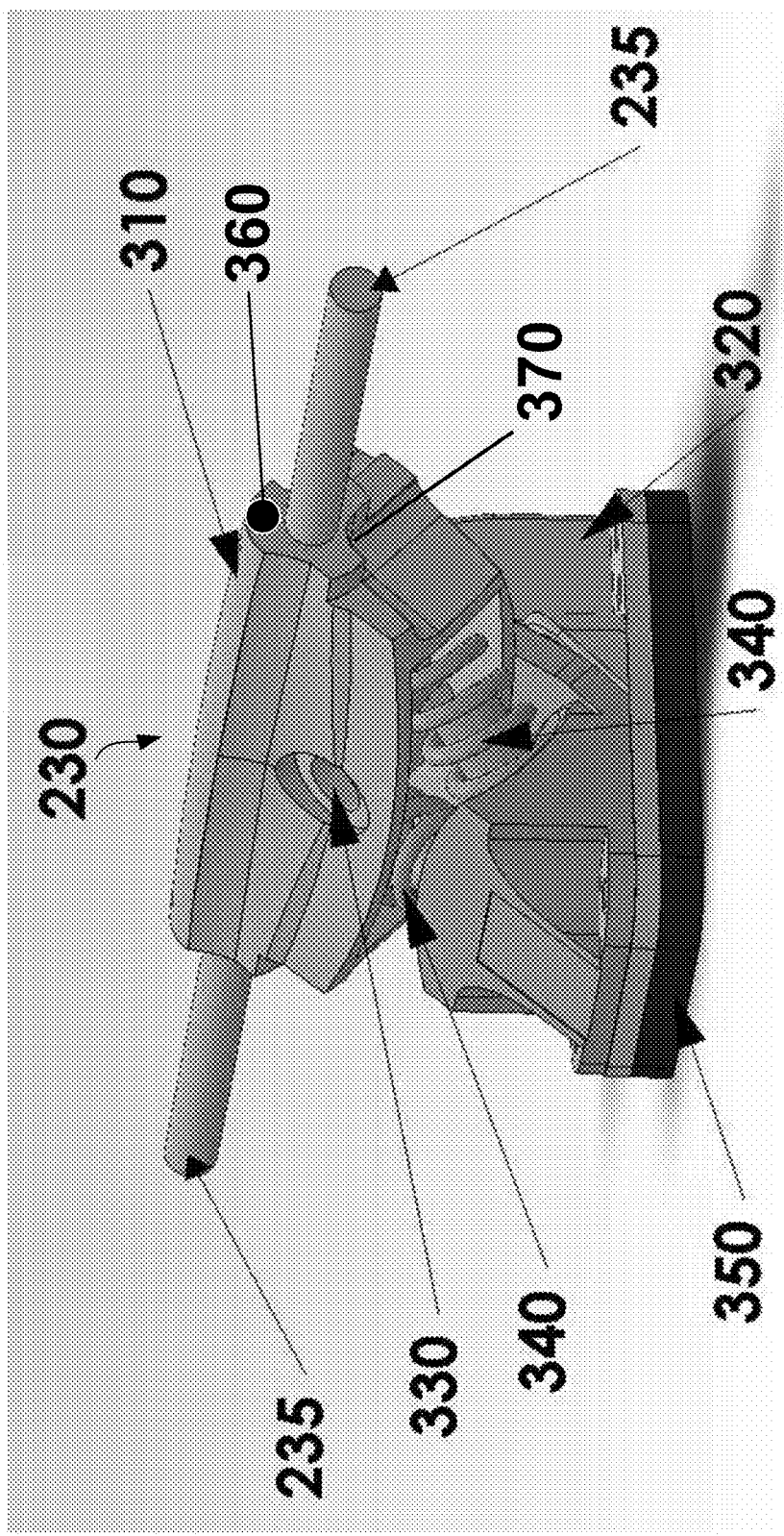
FIG. 3 illustrates a bottom perspective view of a truck assembly, according to embodiments of the present invention.

As shown in FIGS. 2 and 3, the front and rear trucks 230, 230' are composed of several components. The truck 230 is composed of a first portion 320 which is coupled to the deck 225, and a second portion 310. The trucks 230, 230' are coupled to the deck 225 with truck bolts 295. In other embodiments the trucks are coupled to the deck in other ways. The second portion 310 tilts or pivots with respect to the first portion 320 about a truck pivot 330. Wheels 210 or wheel motors 220 are mounted on the truck axle 235 which is rigidly and/or fixedly coupled to the second portion 310. Tilt performance is controlled and improved by two truck springs 340 which are coupled to the first portion 320 and the second portion 310, and which serve to bias the second portion 310 toward a "wheels straight" position in the absence of turning forces. In other embodiments, fewer than two springs, more than two springs, or other biasing technologies may be used to bias the second portion 310 toward the "wheels straight" position. The tilt of the trucks 230, 230' (which is based on the user's 120 left to right weight distribution) allows the PVS 110 to be steered left or right. When the PVS 110 is turning, two wheel motors coupled to the same truck cover different amounts of distance and therefore spin at different speeds. The control system 280 allows the two wheel motors to operate at different speeds by maintaining substantially equal force for each wheel motor. Operating the two wheel motors at substantially equal force allows for traction control by preventing excess wheel slippage and spin outs. The independent operation of the two wheel motors allows the PVS 110 to smoothly turn either left or right. The base damper 350 further improves performance and control of the PVS 110.

As shown in FIGS. 3, 4, 5a, 5b, and 6, the wheel motors 220 are wheels with an internal self-contained electric motor. The wheel motors 220 do not require external motors, external belts or chains, external gears or gear systems, external transmissions, or power couplings. In one embodiment the wheel motors 220 are both gearless and brushless electric motors. In one embodiment the wheel motors 220 are comprised of a wheel motor assembly including a non-rotational stator shaft 1 which prevents the stator 6 from turning, an inner bearing 2, an inner endcap 4, a rotor position sensor 9, magnets 17 which are fixed to the inside of a flux ring 3, a traction surface 22 which surrounds the flux ring 3 (see FIG. 8), an outer endcap 5, an outer bearing 11, a washer 12, and a compressing connector 20, such as a nut, for example. The inner endcap 4 and the outer endcap 5 enclose the two outermost ends of the wheel motor assembly. The traction surface 22 provides adequate friction with the travel surface. In one embodiment the traction surface 22 is rubber. The rotor position sensor 9 communicates with the control system 280 through connecting wires. The rotor position sensor 9 monitors the position and rotational velocity (e.g. in rotations per minute or rpm) of the rotating magnets 17. In one embodiment the rotor position sensor is a hall effect and/or hall sensor. In one embodiment, the stator shaft 1 is prevented from rotating on the truck axle 235 by a pin 35; where the pin is inserted or flexibly coupled with a pin hole 360 on the axle 230 and a pin grove 40 on the stator shaft 1. In other embodiments the stator shaft is prevented from rotating by other mechanical means. A single compressing connector 20 in combination with the stator shaft 1 compresses the components of the wheel motor 220 by coupling the compressing connector 20 to the truck axle 235. In one embodiment the truck axle is threaded and the compressing connector is a nut. In another embodiment the truck axle has a hollow and threaded center core and the compressing connector is a bolt. Using only one compressing connector 20 to compress the wheel motor 220 allows for an efficient, compact, lightweight, watertight, and dust tight design. The stator shaft 1, stator 6, and rotor position sensor 9 form the non-rotating stator assembly ("stator assembly"). The magnets 17, flux ring 3, traction surface 22, inner endcap 4, and the outer endcap 5 form the rotating rotor assembly ("rotor assembly"). In one embodiment the wheel motor 220 is assembled by inserting the stator shaft 1 over a truck axle 235, inserting the inner bearing 2 over the stator shaft 1, inserting the inner endcap 4 over the stator shaft 1, inserting the rotor position sensor 9 over the stator shaft 1, inserting the stator 6 over the stator shaft 1, inserting the magnets 17, flux ring 3, and traction surface 22 over the stator 6; inserting the outer endcap 5 over the stator shaft 1, inserting the outer bearing 11 over the stator shaft 1, and compressing the components with a washer 12 and single compressing connector 20 where the compressing connector 20 couples to the truck axle 235.

The wheel motor 220 operates by passing electrical current through electrically conductive wiring in the stator 6 which generates a magnetic field. In one embodiment the stator is a three phase stator. The magnetic field exerts a magnetic force on the magnets 17 causing the magnets 17, which are part of the rotating rotor assembly, to spin. A small gap between the stator 6 and the magnets 17 called a flux gap prevents the non-rotating stator assembly and the rotating rotor assembly from touching. The inner bearing 2 and the outer bearing 11 help maintain the proper position between the non-rotating stator assembly and the rotating rotor assembly. While in operation the inner bearing 2 and the outer bearing 11 reduce the friction between the moving and stationary parts of the motor. For maximum efficiency the flux ring 3 may be made out of a magnetically conductive material, according to some embodiments. The flux ring 3 may also be made from a strong and durable material as it provides structural support for the wheel motor, according to some embodiments.

To maximize power, torque, efficiency, and durability of the wheel motor 220, the wheel motor 220 benefits from proper cooling. Magnets in wheel motors operate more efficiently at cooler temperatures. In one embodiment, the magnets 17 are permanent magnets that lose efficiency at high temperature, for example temperatures exceeding eighty degrees Celsius; further extended exposure to excess heat may in some cases damage the magnets 17 and reduce their lifespans. The wheel motor 220 uses two forms of passive cooling. The flux gap between the stator 6 and the magnets 17 prevents efficient heat transfer between the stator assembly and the rotor assembly. Therefore, both the stator assembly and the rotor assembly may include separate passive cooling mechanisms. The stator assembly is in conductive thermal communication with the truck axle 235 and the truck 230. The truck axle 235 and the truck 230 are made of a material with a high heat transfer coefficient, which allows the truck axle 235 and the truck 230 to act as heat sinks for the stator assembly.

Figure 5:
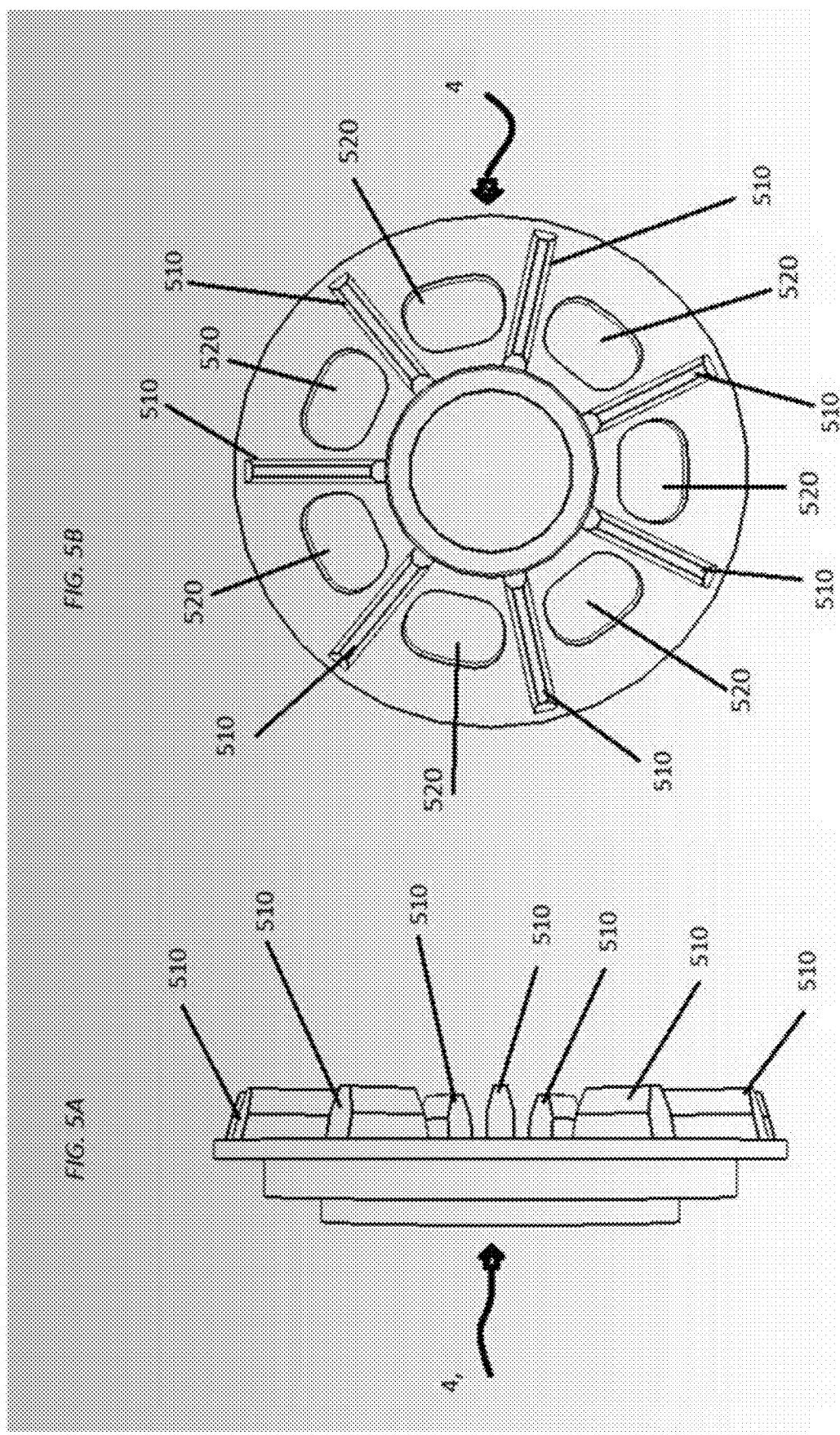
FIG. 5A illustrates a front view of the inner endcap, according to embodiments of the present invention.
FIG. 5B illustrates a side view of the inner endcap shown in FIG. 5A.

Further, convective cooling is achieved as the PVS 110 moves and air passes over the truck 235. In one embodiment the trucks 230, 230' are made of aluminum. The rotating rotor assembly, which includes the magnets 17, is cooled by convective cooling which is assisted by the inner endcap 4 and the outer endcap 5. The magnets 17 and the flux ring 3 are in conductive thermal communication with both the inner endcap 4 and the outer endcap 5. The flux ring 3 is made from a material with a high heat transfer coefficient. In one embodiment the flux ring 3 is made from aluminum or iron. The endcaps 4, 5 are made from a material with a high heat transfer coefficient, and include at least one fin 510. As the wheel motor 220 spins, the endcaps 4, 5 spin with the flux ring 3 and the magnets 17. The spinning of the endcaps 4, 5 and the attached fins 510, which extend in a radial orientation from the wheel rotational axis, increases convective cooling from the endcaps 4, 5. The profile of the fins 510 increases convection by increasing the movement and turbulence of the surrounding air. The fins 510 also increase the surface area of the endcaps 4, 5 which increases heat dissipation. In one embodiment multiple fins 510 are located on each endcap 4, 5 and the fins 510 are equally distributed angularly along the radius of the endcap 4, 5 to improve heat dissipation. In one embodiment there are an equal number of fins 510 on inner endcap 4 and the outer endcap 5 so that heat transfer and cooling of the magnets 17 is substantially equal along the length of the wheel rotational axis 690 (see FIG. 6) of the wheel motor. According to other embodiments, the inner endcap 4 has more fins 510, and/or smaller fins 510, than the fins 510 on the outer endcap 5. As illustrated in FIG. 5, divots 520 in the endcaps 4, 5 provide additional cooling benefits and reduce the weight of the endcaps 4, 5. In one embodiment the endcaps 4, 5 and the fins 510 are made from aluminum. According to some embodiments, one or more fins 510 are substantially straight along a radius of the endcap 5. According to other embodiments, one or more fins 510 have varying geometries; for example, one or more fins 510 may be curved over part of or their entire lengths.

Figure 4:
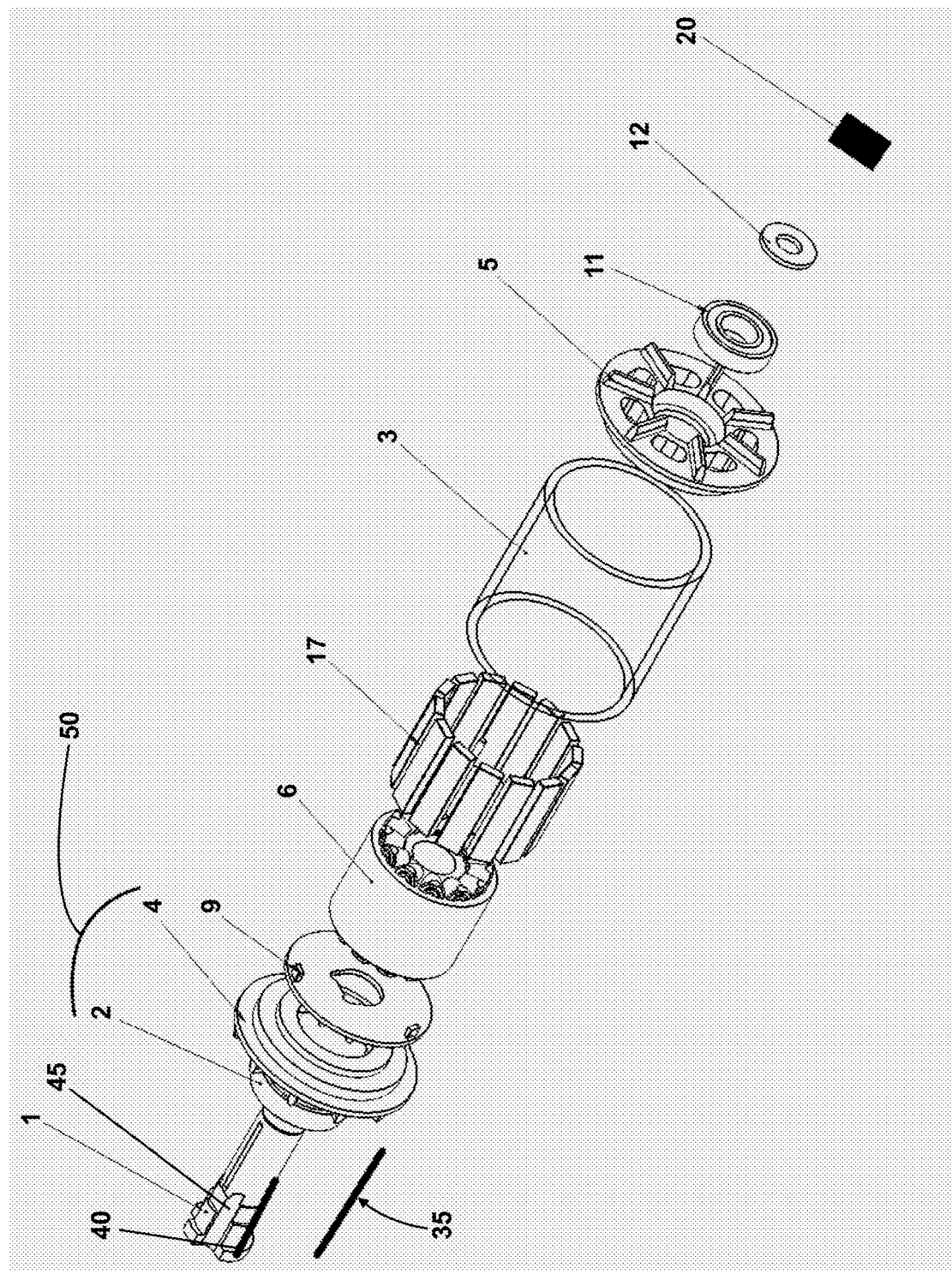
FIG. 4 illustrates an exploded view of the components of the wheel motor, according to embodiments of the present invention.
Figure 6:
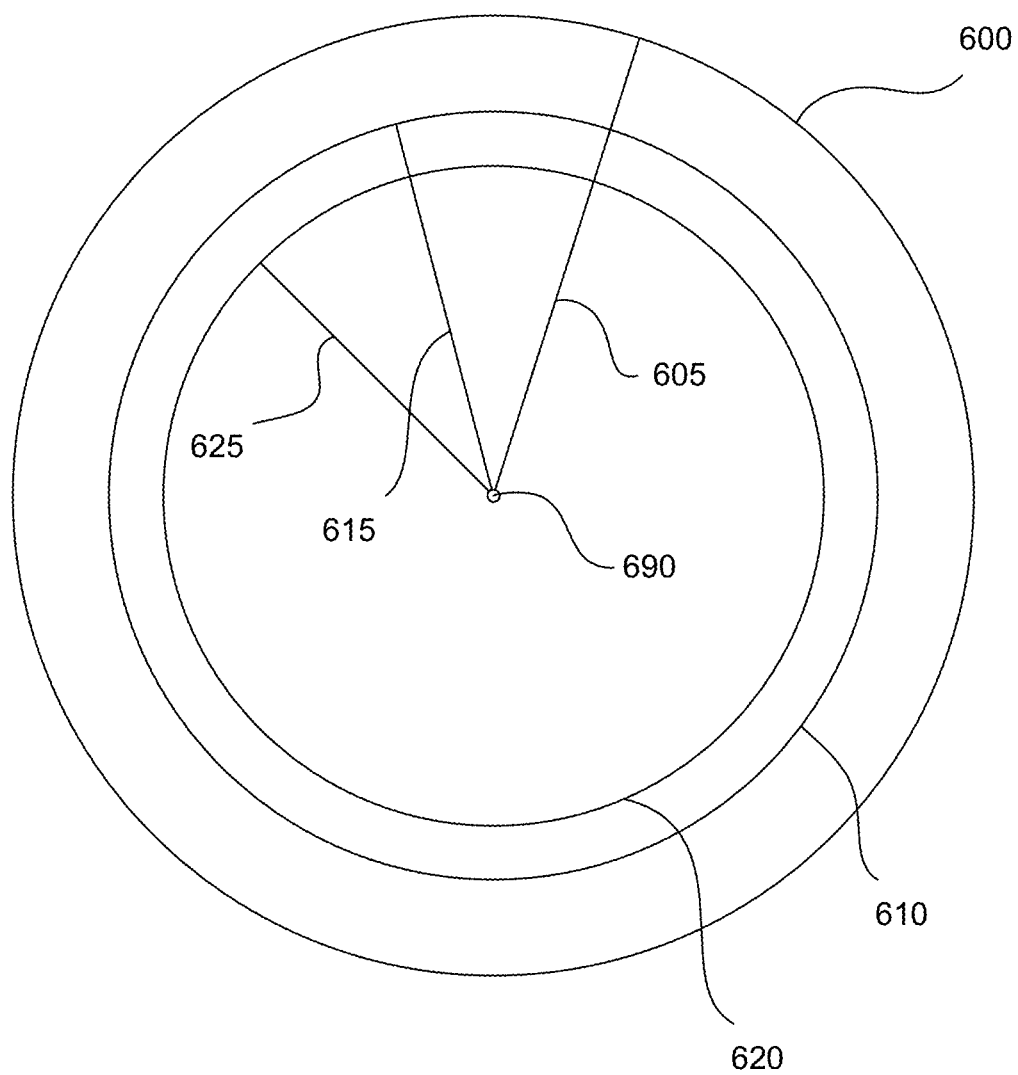
FIG. 6 illustrates a side perspective of a wheel motor, according to embodiments of the present invention.
Figure 7:
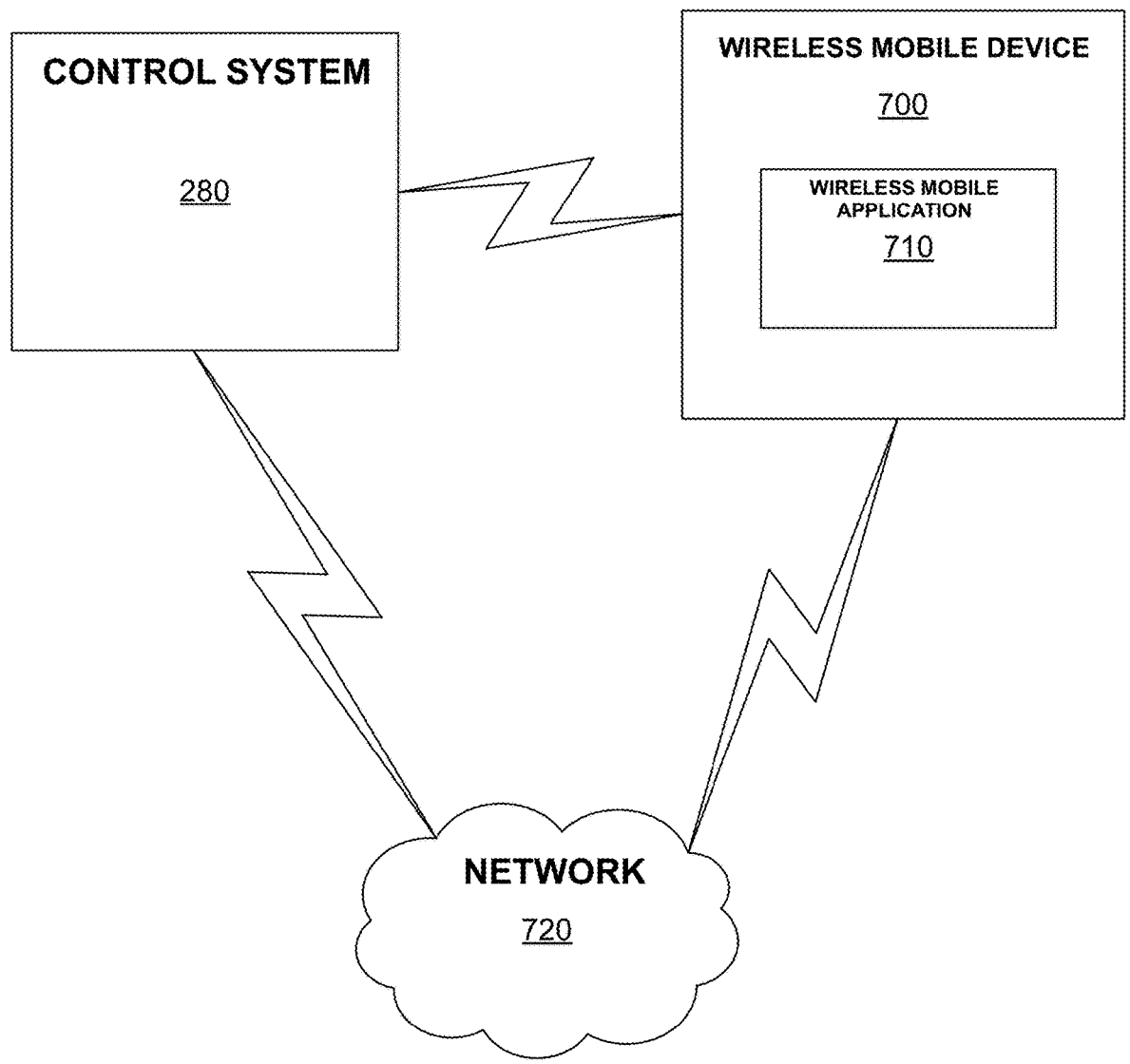
FIG. 7 illustrates wireless communication between a control system and a mobile wireless application, according to embodiments of the present invention.

As shown in FIGS. 4 and 6, a wheel motor 220 is most efficient and produces the most torque when the ratio of the length of the torque arm of the wheel motor, compared to the length of the total wheel radius of the wheel motor, approaches one. The magnets 17, flux ring 3, and traction surface 22 form the rotating flux canister ("flux canister"). A first radius 625 is the distance between outermost circumference of the stator 620 and the wheel rotational axis 690. A second radius 615 is the distance between the innermost circumference of the flux canister 610 and the wheel rotational axis 690. A third radius 605 is the distance between the outermost circumference of the flux canister 600 and the wheel rotational axis 690. The gap or area between outer surface 610 and inner surface 600 may be referred to as the flux gap. The length of the torque arm is the average of the length of the first radius and the length of the second radius. In one embodiment the length of the torque arm is the distance between the middle of the flux gap and the wheel rotational axis 690. The length of the total wheel radius is the length of the third radius. By constructing the wheel motor 220 out of strong, durable materials, using a one bolt 20 assembly, and by utilizing the two passive cooling systems, the wheel motor 220 is able to be compactly designed. The compact design of the wheel motor 220 allows the ratio of the length of torque arm compared to the length of the total wheel radius to approach one. In one embodiment the length of the torque arm (average of lengths 605 and 615) is at least 59% the length of the total wheel radius 605. In other embodiments, the length of the torque arm (average of lengths 605 and 615) is between 30% and 90%, or 40% and 80%, or 50% and 75%, or 55% and 65% of the length of the total wheel radius 605.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method of calibrating a personal vehicle control system having a sensor system and an electronic hardware component, the method comprising:

first, receiving a lean forward calibration measurement from the sensor system in response to a user leaning in a first direction on a personal vehicle system when the personal vehicle system is in a calibration mode;

second, receiving a lean backward calibration measurement from the sensor system in response to the user leaning in a second direction on the personal vehicle system when the personal vehicle system is in the calibration mode;

computing a normalization value using the electronic hardware component, as a function of the lean back calibration value, the lean forward calibration value, and a predetermined normalization constant, wherein each of the lean forward calibration value and the lean backward calibration value is determined from respective relative outputs of at least two force sensors of the load sensor system coupled in different locations with a deck of the personal vehicle system; and capping motor current as a function of a saturation limit determined according to a pre-stored sensitivity value thereby speed-limiting at least one wheel motor.

2. The method of claim 1 further comprising receiving the sensitivity value, via a user interface in the calibration mode, in response to prompting the user to set the sensitivity value.

3. The method of claim 1 further comprising controlling the motor current to at least one wheel motor of the personal vehicle system as a function of the normalization value.

4. The method of claim 1 wherein the sensor system comprises a strain gauge.

5. The method of claim 1 further comprising storing the lean forward calibration measurement in a memory of the electronic hardware component.

6. The method of claim 1 further comprising:
first prompting the user, via a user interface in the calibration mode, to lean in a first direction on the personal vehicle system, wherein the first receiving is in response to the first prompting.

7. The method of claim 6 wherein prompting the user comprises displaying a prompt on the user interface via a smart device in communication with the personal vehicle system.

8. A method of controlling a personal vehicle system having a load sensor system, an electronic hardware component, and at least one wheel motor, the method comprising:
calibrating the personal vehicle system through a procedure including:
receiving a calibration initiation signal from a user input device;
measuring a lean forward calibration value using the load sensor system;
measuring a lean backward calibration value using the load sensor system;
computing a normalization value using the electronic hardware component as a function of the lean backward calibration value, the lean forward calibration value, and a pre-determined normalizing constant;
controlling a motor current to the at least one wheel motor as a function of the normalization value;
receiving at least one operating parameter from the wheel motor;
receiving a signal from the load sensor system, wherein the lean forward calibration value and the lean backward calibration value are determined from relative outputs of at least two force sensors within the load sensor system; and capping the normalization value by a saturation limit determined from a pre-stored sensitivity value thereby limiting a maximum speed of the at least one wheel motor.

9. The method of claim 8 further comprising adjusting the motor current based on at least one of the signal from the load sensor system, the at least one operating parameter from the wheel motor, or the normalization value.

10. The method of claim 8 wherein the load sensor system is mounted on a side rail of a deck.

11. The method of claim 8 wherein the load sensor system comprises at least one strain gauge.

12. The method of claim 8 wherein the method further comprises selecting, via a mobile computing device, a controlled state.

13. A control system for a personal vehicle device comprising:
a sensor system having a lean forward output and a lean backward output;
a user interface which prompts a user to lean in a first and a second direction;
a readable storage device with calibration instructions stored thereon; that, when executed on a processor, perform the steps of:
subtracting the lean backward output from the lean forward output; and computing a normalization value as a function of the lean backward output, the lean forward output, and a pre-determined normalization constant, wherein the sensor system comprises at least one force sensor fixed to a deck of the personal vehicle system.

14. The system of claim 13 further comprising generating a motor current command as a function of the normalization value.

15. The system of claim 13 wherein the user interface is a smart device in communication with the personal vehicle system.

16. The system of claim 13 wherein the lean forward calibration value and the lean backward calibration value are determined from the relative outputs of at least two force sensors in the sensor system.

17. The system of claim 13 wherein the sensor system comprises at least one strain gauge.

18. The system of claim 13 further comprising a mobile computing device configured to select a controlled state.

* * * * *